J. H. FINCH, Jr.
GASOLENE FILTER OR TRAP.
APPLICATION FILED JUNE 30, 1913.

1,094,321.

Patented Apr. 21, 1914.

Inventor
James H. Finch Jr.,

Witnesses

By

Attorney

UNITED STATES PATENT OFFICE.

JAMES H. FINCH, JR., OF QUINCY, MASSACHUSETTS.

GASOLENE FILTER OR TRAP.

1,094,321.  Specification of Letters Patent.  Patented Apr. 21, 1914.

Application filed June 30, 1913. Serial No. 776,711.

*To all whom it may concern:*

Be it known that I, JAMES H. FINCH, Jr., a citizen of the United States, residing at Quincy, in the county of Norfolk and State of Massachusetts, have invented certain new and useful Improvements in Gasolene Filters or Traps; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in gasolene filters or traps for automobiles, motor boats, etc., designed to be applied to the fuel pipe between the tank and carbureter and adapted to catch water or other foreign matter which may be contained within the fuel, thereby cleansing the latter before passing to the engine.

The invention comprises various details of construction and combinations and arrangements of parts which will be hereinafter fully described, shown in the accompanying drawings and then specifically defined in the appended claims.

I illustrate my invention in the accompanying drawings, in which:—

Figure 1:
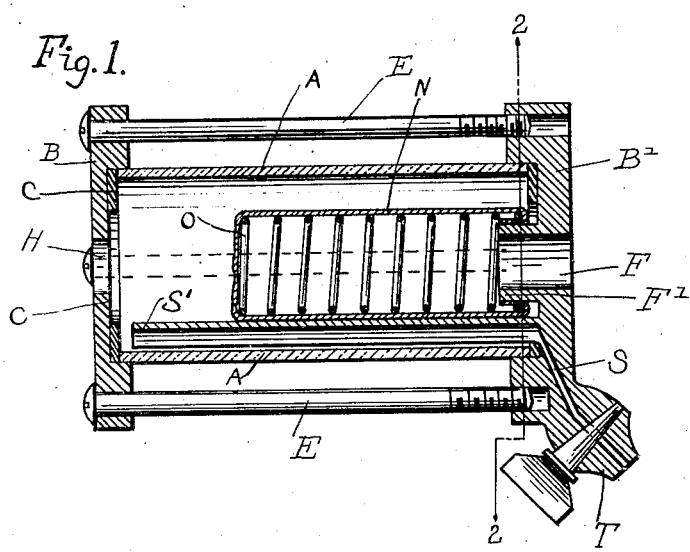
Figure 2:
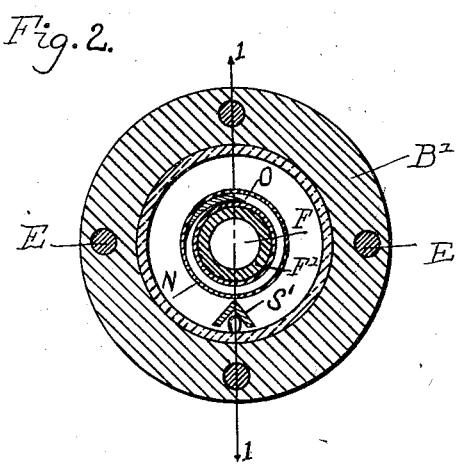

Figure 1 is a central longitudinal sectional view through a filter made in accordance with my invention, and Fig. 2 is a cross sectional view on line 2—2 of Fig. 1.

Reference now being had to the details of the drawings by letter, A designates a cylindrical open-ended shell, preferably of glass, and B and B' designate metallic heads, each recessed upon its inner face and adapted to receive the ends of the washer C and against which the ends of the cylindrical shell A bear. Screws, designated by letter E, pass through registering apertures in the heads, the threaded ends of the screws engaging threads formed in one head and serving as means for holding the parts securely together.

The head B' has a central exit opening F about which a boss F' projects, said exit opening F being adapted to be connected to a carbureter or vaporizer not shown. The opposite end B has an inlet opening H for connection to a supply tank, not shown. A filter member formed in the shape of a bag is provided and which is designated by letter N and has its open end fitted over said boss, a coiled spring O being mounted within the filter and telescoping over the boss and serving to hold the filter bag, which is made preferably of chamois or any other suitable material which might be well adapted for the purpose. The head B' has a duct S leading therethrough and communicates with a drainage cock T, whereby water or any foreign matter may be conducted away from the reservoir.

Fastened to the inner surface of the head B' is an inverted V-shape water or foreign matter shedding member S' which covers the duct S and which is provided for the purpose of causing water or other foreign matter in the gasolene or kerosene to flow out through the valve-regulated duct before the passage of any gasolene therethrough, the pressure of the gasolene or other fuel being adapted to force the foreign matter out of the reservoir.

By the provision of a filtering device embodying the features of my invention, it will be noted that the chamois skin or other filtering covering will be held in shape by the coiled spring, serving to receive any extra pressure of fuel or water which may flow into the reservoir at the end opposite the outlet.

What I claim to be new is:—

1. A filter for fuel comprising a reservoir having ends with inlet and exit openings and a valve-regulated drain duct, a filter of chamois skin or other fabric inside the reservoir and about the exit opening, a spring mounted within said filter and a foreign matter shedding device positioned underneath said fabric and over the valve duct, as set forth.

2. A filter for fuel comprising a reservoir having ends with inlet and exit openings and a valve-regulated drain duct, one end of the reservoir having a boss, a filter bag closed at one end and at its open end fitted over said boss, a spring mounted within the filter bag and holding the latter against said boss, and a foreign matter shedding device positioned underneath the filter bag and over the valve regulating the duct, as set forth.

3. A filter for fuel comprising a reservoir having ends with inlet and exit openings and a valve-regulated drain duct, one end of the reservoir having a boss, a filter bag closed at one end and at its open end fitted over said boss, a spring mounted within the filter bag and holding the latter against said boss, and an inverted trough-shaped shedding device fastened to one end of the cylinder, over the valve-regulated duct and underneath said filter bag, as set forth.

4. A filtering device for gasolene and other fuel comprising an open-ended cylindrical shell, end sections which are recessed upon their inner faces, packings seated in said recesses against which the ends of the shell are adapted to contact, screws for holding the heads against the ends of the shell, one end of the shell provided with an inlet opening and the other with an outlet opening and valve-regulated drain duct, a boss projecting from the inner face of one head about said exit opening, a filter bag of chamois or other suitable material telescoping over said boss and closed at its opposite end, a spring within the filter bag, and a foreign matter shedding device projecting from one of said ends and positioned underneath the filter bag and over said duct, as set forth.

In testimony whereof I hereunto affix my signature in presence of two witnesses.

JAMES H. FINCH, JR.

Witnesses:
F. A. SIMMONS,
CHAS. M. HEMENWAY.